Patented Feb. 2, 1926.

1,571,502

UNITED STATES PATENT OFFICE.

LIONEL VENN-BROWN, OF LONGUEVILLE, NEW SOUTH WALES, AUSTRALIA.

METAL-EXTRACTION PROCESS.

No Drawing.     Application filed September 23, 1924.  Serial No. 739,432.

*To all whom it may concern:*

Be it known that I, LIONEL VENN-BROWN, a subject of the King of Great Britain and Ireland, and resident of Lucretia Avenue, Longueville, in the State of New South Wales, Commonwealth of Australia, have invented certain new and useful Improvements in Metal-Extraction Processes (for which I have filed application in Australia, No. 14966, on the 29th day of October, 1923; South Africa, No. 582, on the 18th day of June, 1924; and Mexico, No. 27589, on the 27th June, 1924), of which the following is a specification.

This invention relates to the recovery from their ores of metals or metal salts such as lead, zinc, copper, silver and others capable of forming chlorides.

The term "ore" or "ores" in this specification is intended to include ore which has been previously treated to eliminate silica, the remainder being then in the condition technically known as "speiss," and also to include any material containing metals or their compounds in such condition that they are capable of forming chlorides, and capable of treatment by the hereinafter described process. For example, ore which has been previously treated for the elimination of sulphur or silica, or for the extraction of certain values but which though not in the condition usually designated as "ore," still contains recoverable metal values, is to be embraced by the term "ore."

The recovery of metals from their ores by chloridizing which includes roasting in conjunction or admixture with chloride of sodium or alkaline earth chlorides and/or of iron, as ordinarily practiced is costly and imperfect in reaction. Some such processes rely on decomposition by interreaction of the iron chloride with the combined sulphur present in the ore. Other such processes rely on decomposition of iron chloride and formation of chlorides of the metals to be recovered, in accordance with one or any of the following reactions which are typical of present chloridizing processes $$2NaCl + FeSO_4 = Na_2SO_4 + FeCl_2$$
$$FeCl_2 + CuSO_4 = FeSO_4 + CuCl_2$$

or

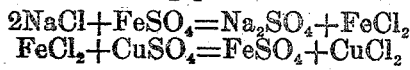
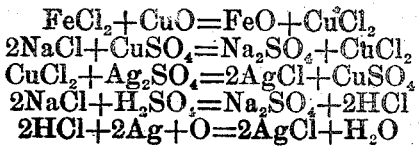

Processes relying on the above reaction have not proved entirely satisfactory owing to the difficulty of controlling the sulphur contents of the ore, incomplete reaction due to the physical condition of the mass, a tendency to re-decomposition at high temperatures of certain of the metal chlorides formed, and losses by volatilization.

Chloridization of ores in solution by the use of acids or acid salts as solvents of the metals to be recovered and involving the regeneration or re-oxidation of the chloride solution for re-use, has also proved unsatisfactory owing to the difficulty and cost of handling and transporting the acid or acid salt and of regenerating the solution, and the high cost due to consumption of chlorine radical by iron and/or arsenic.

The objects and advantages of my invention are:

1. Employment of comparatively low temperature.

2. Avoidance of the use of acid or acid salt (necessary in the leaching operation in other processes as hitherto practiced) with its or their attendant disadvantages of corrosive action and difficulty and cost of handling and transporting.

3. Rendering insoluble any iron and arsenic present in the ore (while rendering soluble the metals or metal salts to be recovered), thereby reducing the consumption of acid radical by the amount which would otherwise be employed in rendering soluble such arsenic and iron.

4. Economy in operation, inasmuch as the acid radical is recovered in the final stages for re-use in the preliminary stages, and the reagent employed in such recovery may be a product of the preliminary stage of the process.

5. Simplicity and efficiency.

Iron chlorides when heated at moderate temperatures in an oxidizing atmosphere in the presence of water vapour are decomposed into hydrochloric acid and ferric oxide, the reaction being chemically expressed as follows:

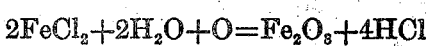

or

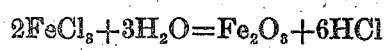

the reaction being accelerated by the catalytic action of the $Fe_2O_3$ so formed. This reaction I make use of in my process.

My process consists in subjecting iron chloride in an oxidizing atmosphere and in the presence of water vapour to sufficient heat (150° C. to 200° C.) to decompose it into ferric oxide $Fe_2O_3$ and HCl, the latter being evolved as gas, and subjecting the finely ground ore in the presence of moisture to the action of the hydrochloric acid gas so obtained to convert the soluble chlorides, metals or metal salts to be recovered, drying the mass by heating to a temperature of from 150° C. to 200° C. for the purposes hereinafter explained, leaching out the remaining unvolatilized soluble chlorides with a suitable non-acid solvent liquor, treating the resulting chloride solution in known manner for the recovery of metal values, and at the same time recovering the acid radical (chlorine) on scrap or metallic iron or oxide or iron (the latter being conveniently obtained from the preliminary decomposition of iron chloride). The iron chloride so obtained is available for re-use as a source of HCl.

It is well known that arsenic combines with iron in ferric state to form an insoluble iron-arsenic compound. If therefore the ore under treatment contains arsenic with an insufficiency of iron to combine with all the arsenic present I add iron to the ore before treatment. This added iron and any iron present is converted to chloride, but when subjected to sufficient heat (applied in the drying process) this iron chloride is decomposed, the ferric iron combining with arsenic present (if any) or being converted to insoluble ferric oxide, while the HCl liberated reacts on fresh ore.

The heating volatilizes certain chlorides (if present) such as tin and arsenic (the latter, when not combined with iron) which however are not necessarily lost but may be recovered in known manner.

My process also consists in subjecting an admixture of finely ground ore and iron chloride in the presence of water vapour to sufficient heat (150° C. to 200° C.) to decompose the latter as before stated, the liberated HCl gas combining with the metals or metal salts to form soluble chlorides thereof heating, leaching out the unvolatilized soluble chlorides and treating the resultant chloride solution as before stated.

Reaction starts when the temperature reaches 100° C. and moisture is removed—but the reaction at such temperature is too slow for practical purposes, while temperatures higher than 200° C. are liable to decompose chlorides of metals subsequently to be leached out and are uneconomical.

The character of the leaching liquid depends on the nature of the metals to be recovered, e. g. if chlorides of these metals or metal salts are readily soluble in water the latter may constitute the leaching fluid, but if silver and/or lead and/or cuprous chloride is or are present I employ in known manner a suitable leaching solution such as $NaCl$, $CaCl_2$ or $MgCl_2$.

In the preferred way of carrying out my process the iron chloride is first subjected to sufficient heat in the presence of water vapor to decompose it into HCl and $Fe_2O_3$, the $Fe_2O_3$ being retained for further use or for any purpose to which it may be appropriately applied, or preferably as a combining agent for the subsequent recovery of the acid radical (chlorine) as hereinafter described, while the HCl is drawn off and brought into contact with the ground ore to be treated, said ore, which may (if necessary) have been previously roasted, being contained in a suitable rotary kiln to which is admitted sufficient steam to supply the water vapour requirements, and in which the ore, after the formation of the chlorides, is heated to a temperature of from 150° to 200° C. for the purposes hereinbefore set forth.

Alternatively the ore is ground in an aqueous solution of iron chloride and the resulting mixture placed in the kiln and heated as before stated. In this method the moisture in the mix may be sufficient, on vapourization by the heat, to supply the moisture required without further addition of steam.

As a further alternative the iron chloride may be mixed with the ore after the latter is ground and the mix heated to the required temperature (150° C. to 200° C.) in the presence of steam (if necessary) in a kiln.

In the alternative methods above described ferric oxide as a separate useful commodity is not obtained as in the preferred method.

The heat is applied to the mass in the kiln in such manner as to gradually raise the temperature thereof to the required extent as before stated, the evolved HCl gas being re-absorbed by the material in the cooler portion of the kiln.

Any iron present is converted into insoluble ferric oxide or combines with any arsenic present to form an insoluble iron-arsenic compound, while the HCl combines with the other metals or metal salts, such as lead, silver, zinc and copper, to form soluble chlorides thereof.

I then leach out the remaining unvolatilized soluble chlorides with water or, if silver and/or lead and/or cuprous chloride is or are present, with a hot solution of $NaCl$, $CaCl_2$ or $MgCl_2$.

The resulting chloride solution is then treated in known manner for the recovery of the metallic values, the acid radical (chlorine) being collected on scrap or metallic iron or any other convenient form of iron, preferably on the iron oxide ($Fe_2O_3$) obtained from the first step in the preferred manner of carrying out my process, thus making the process completely cyclic. This recovery is effected with or without the aid of electrolytic action depending on the nature of the metals to be recovered.

Where electrolytic deposition of metals is employed a diaphragm cell with soluble iron anode may be used, or alternatively, an open cell with insoluble anode, the evolved chlorine being passed over iron and the resulting iron chloride returned to the circuit and decomposed as before stated. Thus my process is cyclic in this respect.

I am aware that iron chloride solutions in ferric or acid salt condition have been employed as leaching agents and iron chlorides have been used as chloridizing agents in chloridizing processes as usually practiced in the recovery of metals, but in carrying out my process as before described the iron salt is employed in a novel manner which results in the direct generation of HCl gas in contact with or which is brought into contact with the ore under treatment, thus avoiding the handling or transporting of acid or acid salts, (as hitherto practiced) the HCl being subsequently recovered for re-use.

Furthermore my process is carried out in such manner as to render iron and arsenic insoluble in the non-acid leaching liquor thus avoiding the waste of acid or acid salts in rendering iron and arsenic soluble as practiced in other solution processes, and also saving the cost of separating iron and arsenic from the other metals in solution, and attendant loss of metal values.

The fixation of the iron as arsenate may be assumed to come about thus:—Arsenious chloride ($AsCl_3$) in contact with the moisture present yields arsenious acid:—

$$3H_2O + AsCl_3 = H_3AsO_3 + 3HCl$$

Arsenious acid in contact with the ferrous chloride yields ferrous arsenite:—

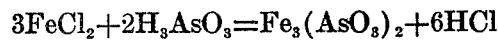
$$3FeCl_2 + 2H_3AsO_3 = Fe_3(AsO_3)_2 + 6HCl$$

The ferrous arsenite is then oxidized to ferric arsenate:—

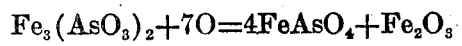
$$Fe_3(AsO_3)_2 + 7O = 4FeAsO_4 + Fe_2O_3$$

I do not guarantee that the above expressed reactions are correct, but it is a fact that whatever the reaction may be an iron-arsenic compound remains and contains all the arsenic present, while the HCl so liberated reacts on further ore.

Any ferric chloride would under the specified conditions form ferric arsenite, the latter in turn being oxidized to ferric arsenate.

The use of iron chloride in the manner described permits the employment of a non-acid leach liquor from which the acid radical (chlorine) is easily recovered as iron chloride during and concurrently with the recovery of the metal values, by a simple and cheap method of precipitation on iron by the well known process of cementation or by electrolysis in conjunction with iron.

What I claim and desire to secure by Letters Patent is:—

1. A process of extracting from their ores metals or metal salts capable of forming soluble chlorides, which consists in subjecting the ore in a fine state of division and in the presence of moisture to the action of hydrochloric acid gas to convert the metallic contents to soluble chlorides, drying the mass and heating it to a temperature sufficient to convert contained base metals (iron, arsenic) into compounds insoluble in non-acid solutions and to volatilize any uncombined arsenic, leaching out with a non-acid leach liquor the remaining soluble chlorides, and treating the chloride solution in known manner for the recovery of the metals and for the recovery of the acid radical (chlorine) in combination with iron as iron chloride.

2. A process of extracting from their ores metals or metal salts capable of forming soluble chlorides, which consists in subjecting iron chloride in the presence of water vapor to sufficient heat to effect decomposition, subjecting the ore (to be treated) in a finely ground condition and in the presence of moisture to the action of the hydrochloric acid resulting from the first step, to convert to soluble chlorides the metals or metal salts to be recovered, drying the mass and heating it to a temperature of from 150° C. to 200° C., leaching out the remaining unvolatilized soluble chlorides with a suitable non-acid solvent liquor, and treating the resulting chloride solution in known manner for the recovery of metal values and for the recovery of the acid radical (chlorine) on iron as iron chloride for use in the regeneration of hydrochloric acid.

3. A process according to claim 2 hereof, in which the iron chloride and ore in a fine state of division are mixed together before the application of heat so that the hydrochloric acid gas is evolved in intimate contact with ore under treatment.

4. A process of extracting from their ores metals or metal salts capable of forming soluble chlorides which consists in grinding the ore in an aqueous solution of iron chloride, subjecting the same in the presence of water vapor to sufficient heat to effect decomposition to the action of the hydrochloric acid resulting from the first step, to convert to soluble chlorides the metals or metal salts to be recovered, drying the mass and heating it to a temperature of from 150° C. to 250° C., bleaching out the remaining unvolatilized soluble chlorides with a suitable non-acid solvent liquor, and treating the resulting chloride solution in known manner for the recovery of metal values and for the recovery of the acid radical (chlorine) on iron as iron chloride for use in the regeneration of hydrochloric acid.

5. A process of extracting from their ores metals, or metal salts capable of forming chlorides which consists in subjecting iron chloride in the presence of water vapor to sufficient heat to evolve hydrochloric acid gas and from ferric oxide, separating the HCl and $Fe_2O_3$, subjecting the ore to be treated to the action of the hydrochloric acid in the presence of moisture to convert to soluble chlorides the metallic contents of the ore, heating the mass to a temperature sufficient (only) to render insoluble in non-acid liquor any iron and arsenic present, drawing off any volatilized metallic chlorides, leaching out the remaining soluble chlorides by means of a suitable non-acid solvent liquor, treating the resulting chloride solution in known manner for the recovery of metallic values, and recovering on $Fe_2O_3$, resulting from the first step in the process, the acid radical (chlorine) as iron chloride for re-use in said first step.

Signed at Sidney, New South Wales, Australia, this twenty-fifth day of August, A. D. 1924.

LIONEL VENN-BROWN.